W. M. LESTER.
STOCK WATERER.
APPLICATION FILED SEPT. 11, 1919. RENEWED FEB. 14, 1921.

1,372,888.  Patented Mar. 29, 1921.

INVENTOR
Wm. M. Lester.
BY
Milton B. Crandall
ATTORNEY

UNITED STATES PATENT OFFICE.

WILLIAM M. LESTER, OF STERLING, COLORADO.

STOCK-WATERER.

1,372,888.　　　　Specification of Letters Patent.　　Patented Mar. 29, 1921.

Application filed September 11, 1919, Serial No. 323,141. Renewed February 14, 1921. Serial No. 445,013.

*To all whom it may concern:*

Be it known that I, WILLIAM M. LESTER, a citizen of the United States, and a resident of Sterling, in the county of Logan and State of Colorado, have invented certain new and useful Improvements in Stock-Waterers, of which the following is a specification.

The invention has for its object the production of a stock-waterer embodying certain improved and novel features of construction and arrangement of parts adapted to maintain the water at a temperature above the freezing point.

A further object of the invention is the production of a non-freezable and sanitary stock-watering device, simple and inexpensive in construction, yet thoroughly efficient in operation.

With these and other objects in view, the invention, consisting in the construction, combination and novel arrangement of parts, will be fully understood from the following description, reference being had to the accompanying drawing, which forms a part of this application and in which like characters of reference indicate corresponding parts throughout the several views, of which,—

Figure 1:
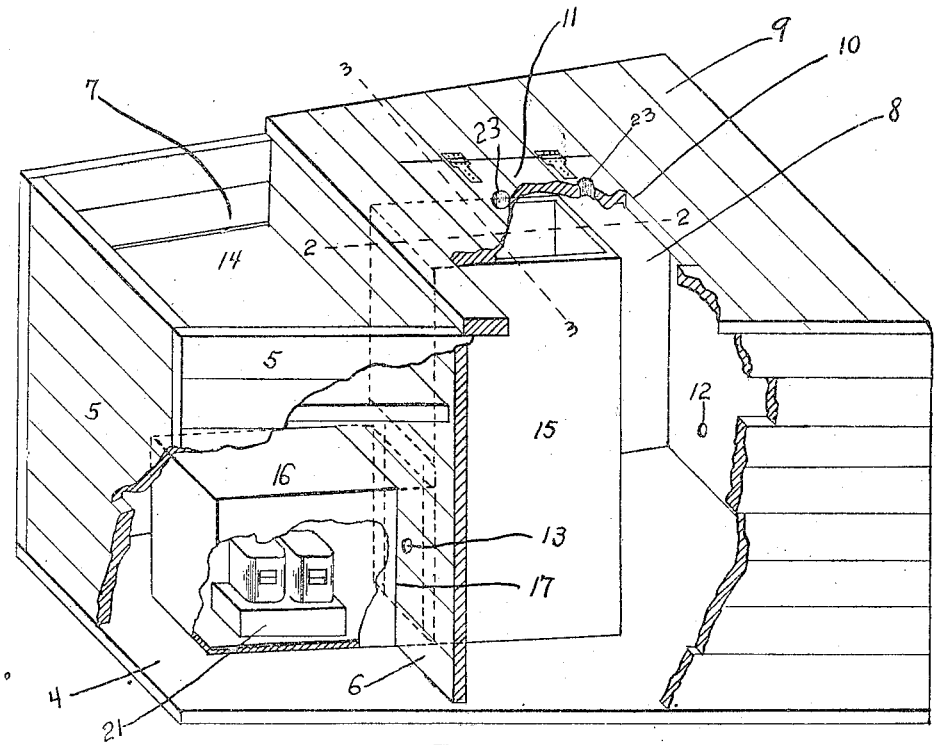
Figure 1 is a perspective view of a stock-watering device constructed in accordance with the invention, parts being cut away to reveal the internal characteristics.
Figures 2, 3:
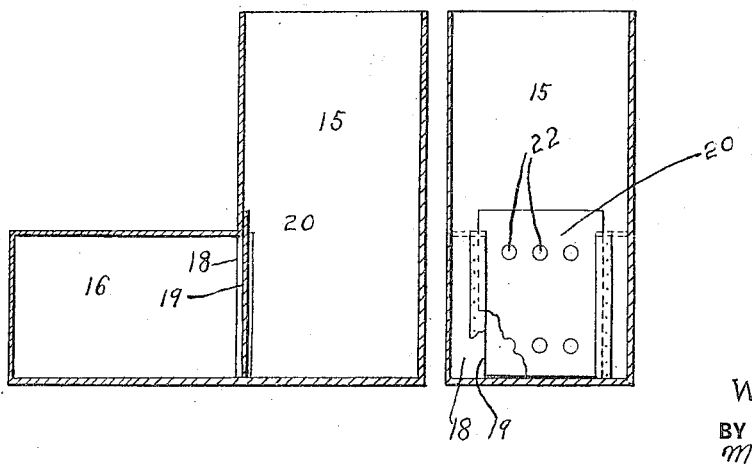
Fig. 2 is a vertical section on the heater container taken approximately on the line 2—2 of Fig. 1.
Fig. 3 is a similar view taken on the line 3—3 of Fig. 1.

While I have illustrated and hereinafter described the preferred embodiment of the invention, I would not be understood as being limited to the specific structure chosen for illustration, for various alterations and modifications may be made in the details of construction and arrangements of parts described, without departing from the spirit and scope of the invention as defined in the appended claims.

Referring, now, to the illustrations, the device consists of a container of any suitable material and shape and including a bottom, 4, side walls, 5, and an intermediate partition, 6, which divides the container into a drinking compartment, 7, and a supply compartment, 8. The supply compartment is provided with a suitable roof or cover, 9, having an opening, 10, normally closed by a door, 11.

The compartment, 8, receives water from any suitable source of supply as through an opening, 12, in an outer wall, of the compartment, 8, and the drinking compartment. 7, is supplied from the compartment, 8, through an opening, 13, in the partition wall, 6. Within the drinking compartment is a flat and preferably impervious float, 14, which fits between the walls, 5 and 6, yet is free to move vertically. The float being supported on the surface of the water prevents entrance of refuse and foreign material from mixing with the water below the float to any great extent; and the animals in drinking depress the float below the surface of the water. Obviously, material which accumulates upon the float may be quite easily removed.

Within the container is a suitable heating chamber, preferably consisting of an L-shaped casing, the upright portion, 15, of which is positioned within the compartment, 8, below the opening, 10; and the horizontal portion, 16, of which extends into the compartment, 7, through an opening, 17, in the partition walls, 6. The upright portion of the casing is separated from the horizontal portion by a wall, 18, having an opening, 19, therein, provided with a door, 20, suitably mounted to open and close the opening, 19. Within the compartment, 16, is a suitable heating device as an oil burner, 21, draft openings, 22 and 23, therefor, being provided in the doors, 20 and 11, respectively.

The burner, 21, may be introduced within and removed from the heating compartment, 16, through the openings, 10 and 19. Also by reaching through the said openings an attendant may regulate the burner within the said compartment.

Now it will be observed that in use the volume of water within the container encompasses the L-shaped casing and is thereby prevented from freezing; and by opening or closing the door, 20, the relative temperatures in the compartments 7 and 8, is readily varied.

Having thus described my invention, what I claim as new and desire to secure by Letters Patent of the United States, is,—

1. A stock-waterer embodying a water container, a partition dividing the same into a drinking compartment and supply compartment, a passage between said compartments, an upright casing within the supply compartment, a lateral compartment on the casing extending through the partition and into the drinking compartment, and a heating device within said lateral compartment.

2. A stock-waterer embodying a water container, a partition dividing the same into a drinking compartment and supply compartment, a passage between said compartments, a top on the latter compartment having a normally closed opening, an upright casing positioned below the opening in the supply compartment, a part of the casing being extended into the drinking compartment, and a heating device within said extended part.

3. A stock-waterer embodying a water container, a partition dividing the same into a drinking compartment and supply compartment, a passage between said compartments, a top on the latter compartment having a normally closed opening, an upright casing positioned below the opening in the supply compartment, a part of the casing being extended into the drinking compartment, a heating device within said extended part, and an adjustable closure between the upright casing and its extended part for regulating the relative temperatures between the casing and its extended part.

In testimony whereof I have hereunto set my hand this 6th day of September, 1919.

WILLIAM M. LESTER.